United States Patent
Leppinen et al.

(10) Patent No.: US 8,974,755 B2
(45) Date of Patent: Mar. 10, 2015

(54) METHOD FOR SEPARATING NICKEL FROM MATERIAL WITH LOW NICKEL CONTENT

(75) Inventors: Jaakko Leppinen, Espoo (FI); Teppo Riihimäki, Linnavuori (FI); Mikko Ruonala, Kantvik (FI)

(73) Assignee: Outotec Oyj, Espoo (FI)

( * ) Notice: Subject to any disclaimer, the term of this patent is extended or adjusted under 35 U.S.C. 154(b) by 0 days.

(21) Appl. No.: 13/993,661

(22) PCT Filed: Dec. 16, 2011

(86) PCT No.: PCT/FI2011/051120
§ 371 (c)(1),
(2), (4) Date: Jun. 12, 2013

(87) PCT Pub. No.: WO2012/080577
PCT Pub. Date: Jun. 21, 2012

(65) Prior Publication Data
US 2013/0266493 A1    Oct. 10, 2013

(30) Foreign Application Priority Data

Dec. 17, 2010  (FI) ..................................... 20100421

(51) Int. Cl.
*C22B 23/00* (2006.01)
*C22B 3/00* (2006.01)

(52) U.S. Cl.
CPC ........... *C22B 23/043* (2013.01); *C22B 23/0415* (2013.01); *C22B 23/0461* (2013.01)
USPC .................................... 423/150.1; 423/150.3

(58) Field of Classification Search
None
See application file for complete search history.

(56) References Cited

U.S. PATENT DOCUMENTS

| | | | |
|---|---|---|---|
| 3,798,304 A * | 3/1974 | Weston | ........................... 423/36 |
| 4,097,575 A | 6/1978 | Chou et al. | |
| 4,410,498 A | 10/1983 | Hatch et al. | |
| 4,415,542 A | 11/1983 | Queneau et al. | |
| 6,846,346 B1 | 1/2005 | Flax | |
| 2002/0006370 A1 * | 1/2002 | Arroyo et al. | .............. 423/150.1 |
| 2006/0002835 A1 | 1/2006 | Neudorf | |
| 2006/0228279 A1 | 10/2006 | Campbell et al. | |

FOREIGN PATENT DOCUMENTS

| | | |
|---|---|---|
| CN | 101006190 A | 7/2007 |
| DE | 147471 A3 | 4/1981 |
| WO | 01/32944 A1 | 5/2001 |
| WO | 2008031203 A1 | 3/2008 |
| WO | 2011/120127 A1 | 10/2011 |

OTHER PUBLICATIONS

International Search Report for PCT/FI2011/051120, completed Mar. 19, 2012, mailed Mar. 28, 2012, 4 pages.
Finnish Search Report for FI20100421, completed Oct. 13, 2011, 2 pages.
Xu U, et al, "Enrichment of valuable metals from the sulfuric acid leach liquors of nickeliferous oxide ores," Hydrometallurgy, vol. 95 (2009), 5 pages.
Xie X. et al, "Recovery of nickel, copper and cobalt from low-grade Ni-Cu sulfide tailings," Hydrometallurgy, vol. 80, (2005), 5 pages.
Chinese Office action issued May 6, 2014 for application No. 2011/0060529.7, 18 pages.
Jianrong Peng et al., "Study on iron removal after indium precipitation from pressure leaching liquor of indium-enriched and high-iron zinc sulfide concentrate," Hydrometallurgy, vol. 26, No. 2, Jun. 30, 2007.

* cited by examiner

*Primary Examiner* — Steven Bos
(74) *Attorney, Agent, or Firm* — Chernoff, Vihauer, McClung & Stenzel, LLP

(57) ABSTRACT

The invention relates to a method for separating nickel and other valuable metals particularly from material having low nickel content, which contains iron and magnesium in addition to nickel and other valuable metals. The material having low nickel content is subjected to pulping and atmospheric leaching in acidic and oxidizing conditions, in which the majority of the metals in the material dissolve and the iron is partially precipitated. The precipitated iron is separated from the solution, after which nickel and the other dissolved valuable metals are precipitated as sulphides.

17 Claims, 4 Drawing Sheets

METHOD FOR SEPARATING NICKEL FROM MATERIAL WITH LOW NICKEL CONTENT

CROSS-REFERENCE TO RELATED APPLICATION

Figure 1:
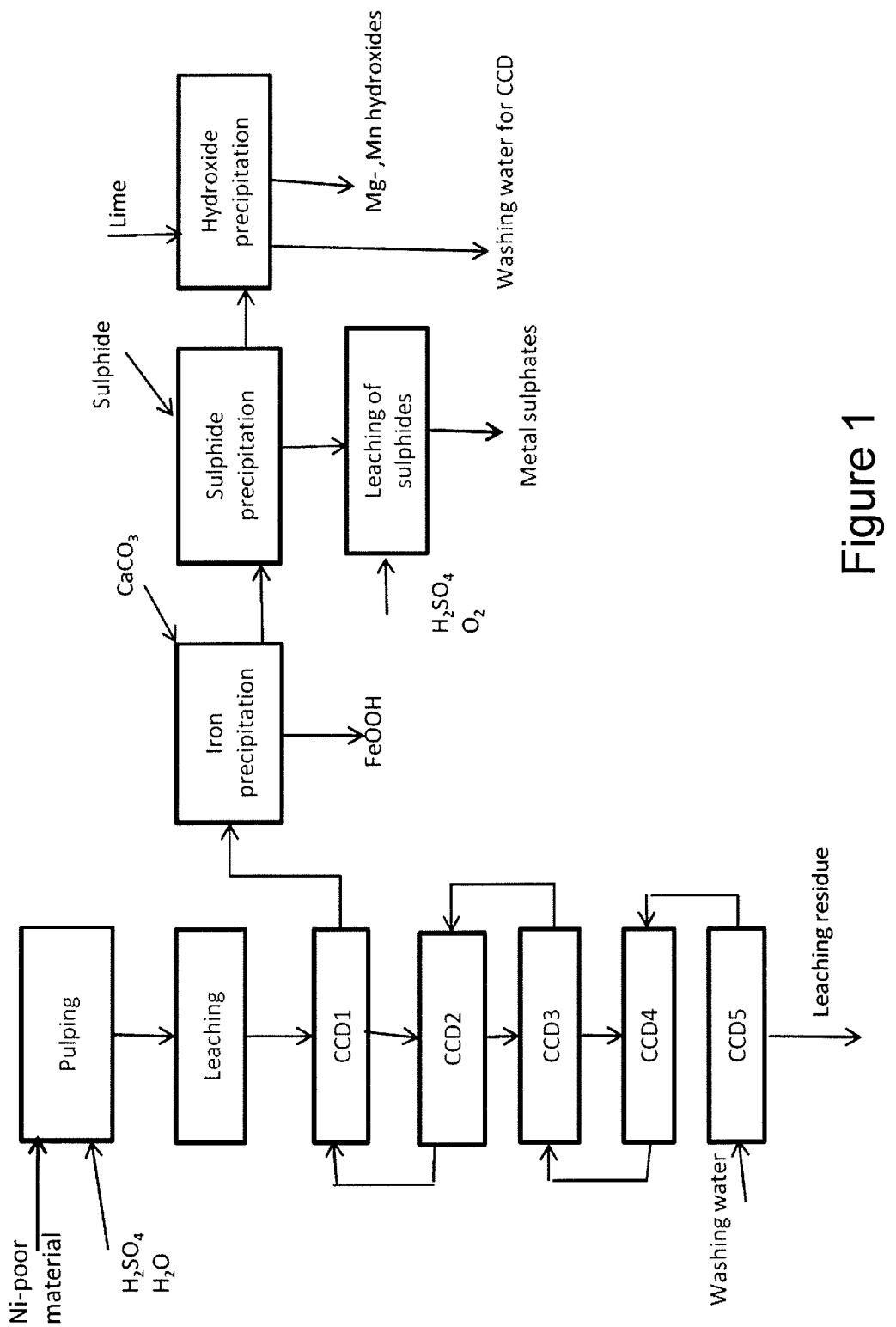

This is a national stage application filed under 35 USC 371 based on International Application No. PCT/FI2011/051120 filed Dec. 16, 2011, and claims priority under 35 USC 119 of Finnish Patent Application No. 20100421 filed Dec. 17, 2010.

FIELD OF THE INVENTION

The invention relates to a method for separating nickel and other valuable metals particularly from material having low nickel content, containing iron and magnesium in addition to nickel and other valuable metals. The nickel-poor material is subjected to pulping and atmospheric leaching in acidic and oxidising conditions, in which the majority of the metals of the material dissolve and the iron partially precipitates. The precipitated iron is separated from the solution, after which nickel and the other dissolved valuable metals are precipitated as sulphides.

BACKGROUND OF THE INVENTION

The separation of a valuable metal mineral from gangue generally takes place by concentration, which includes for example, crushing, grinding and flotation. The purpose of concentration is to achieve a concentrate, in which as large a portion of the valuable minerals as possible is present and as little worthless gangue as possible. Concentration methods are being developed all the time and the recovery of valuable minerals into concentrate is improving. However, there are still always some small amounts of valuable metals ending up in the fraction that is discarded to the waste heap and in particular, as the metal prices have risen, the need to recover the valuable metals in waste also has become apparent. The recovery of nickel in particular from the fraction that has been discarded has become a target of interest, since nickel is an important component of stainless steel.

Nickel-poor material is formed for instance in the concentration process of a nickel-bearing ore, in which the fraction with higher nickel content is separated from the ore by flotation and the tailings are left, which nevertheless still contain some nickel and other valuable metals such as cobalt, copper and zinc. When the nickel ore is mostly sulphidic, the majority of the nickel remaining in the flotation tailings is also in the form of sulphides and only a small amount as silicates. The tailings formed in a multi-stage flotation process are usually routed to a tailings area, even though there is still a small amount of valuable metals in them.

PURPOSE OF THE INVENTION

The purpose of the invention presented here is to disclose a method by means of which the majority of the nickel and other valuable metals, which have remained in the nickel-poor waste material in the context of the concentration of nickel sulphide ore, can be recovered.

SUMMARY OF THE INVENTION

This invention relates to a method for separating nickel and other valuable metals from nickel-poor iron-containing material generated in the nickel ore concentration process, which method comprises a) a pulping stage, wherein the nickel-poor material is pulped into an acid-containing leaching solution, and the pH of the leaching solution is adjusted to a desired range, b) an atmospheric leaching stage, wherein the nickel-poor material obtained from the pulping stage is contacted with an acid-containing solution and an oxygen-containing gas.

More specifically the invention relates to a method for separating nickel and other valuable metals from the nickel-poor material containing iron that is generated in a nickel ore concentration process, whereby the nickel-poor material is pulped in an acid-containing leaching solution, the pH value of which is adjusted to the desired range in order to leach a first part of the nickel contained in the nickel-poor material.

According to one embodiment of the invention, the pH of the leaching solution is adjusted in pulping to the range of 1.5-3.0.

According to one embodiment of the invention, after pulping of the nickel-poor material, it is routed to atmospheric leaching, in which a second part of the nickel, the other valuable metals and the iron are leached by means of an acid-containing solution and an oxygen-containing gas. The first part of the iron is precipitated during the atmospheric leaching stage, after which the precipitated iron is separated from the solution containing a valuable metal and the solution containing a valuable metal is routed to the precipitation of nickel and other valuable metals, which is carried out by means of sulphidation.

Typically the nickel-poor iron-containing material is generated in the nickel ore concentration process. According to one embodiment of the invention, the nickel-poor iron-containing material is tailings of a nickel ore flotation process.

According to one embodiment of the invention, nickel and the other valuable metals are in the nickel-poor material mostly as sulphides.

According to one embodiment of the invention, the pulping and leaching solution of the nickel-poor material is sulphuric acid based.

According to an embodiment of the invention the oxygen containing gas can be any suitable gas mixture which contains oxygen. According to an embodiment of the invention, the oxygen-containing gas is oxygen. According to another embodiment of the invention, the oxygen-containing gas is air. According to a further embodiment of the present invention the oxygen-containing gas is oxygen-enriched air. According to one embodiment of the invention the oxygen-containing gas contains approximately 21-100% oxygen.

In one embodiment of the invention, the first part of the iron is precipitated as jarosite, whereby atmospheric leaching is carried out in a pH range of 1.3-2. The second part of the iron dissolved in the leaching solution is precipitated as goethite or hydroxide by neutralising and oxidising the solution.

In another embodiment of the invention, atmospheric leaching is carried out in a pH range of 2.1-3.0, whereby the first precipitated part of the iron corresponds to the total amount of iron. Iron is precipitated as goethite and hydroxide.

According to one embodiment of the invention, pulping and atmospheric leaching are carried out at a temperature between 60° C. and the boiling point of the solution.

According to one embodiment of the invention, the nickel-poor material is pre-treated with concentrated sulphuric acid before pulping.

According to one embodiment of the invention, the leaching of valuable metal sulphides to sulphates is performed at elevated oxygen pressure. According to one embodiment of the invention the oxygen partial pressure is 2-4 bar at the temperature of 115-135° C.

According to one embodiment of the invention, the leaching solution formed in sulphide precipitation, from which the valuable metals have been removed, contains magnesium and manganese, which are precipitated from the solution by neutralising it.

According to one embodiment of the invention, the valuable metals in the nickel-poor material in addition to nickel are cobalt, copper and zinc.

LIST OF DRAWINGS

Figure 2:
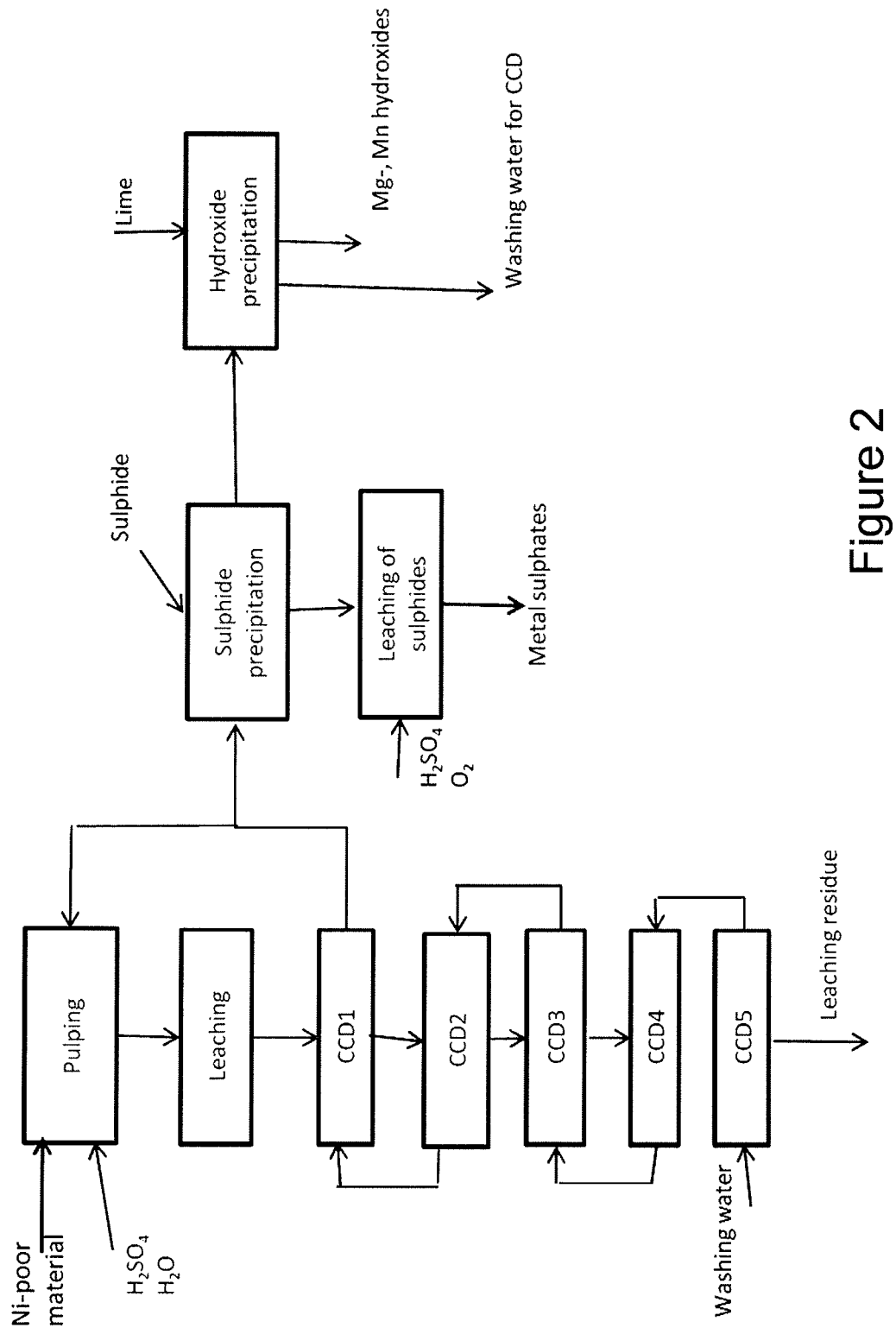
Figure 3:
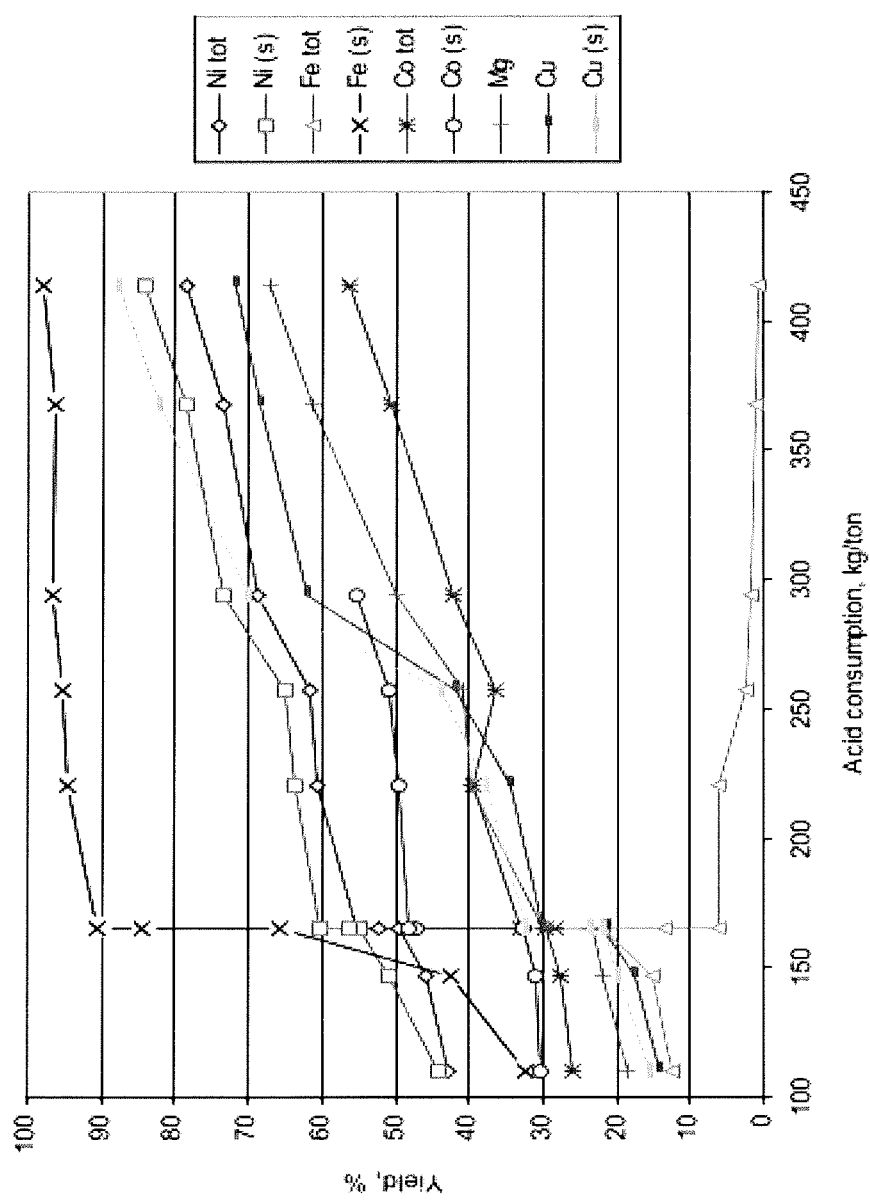
Figure 4:
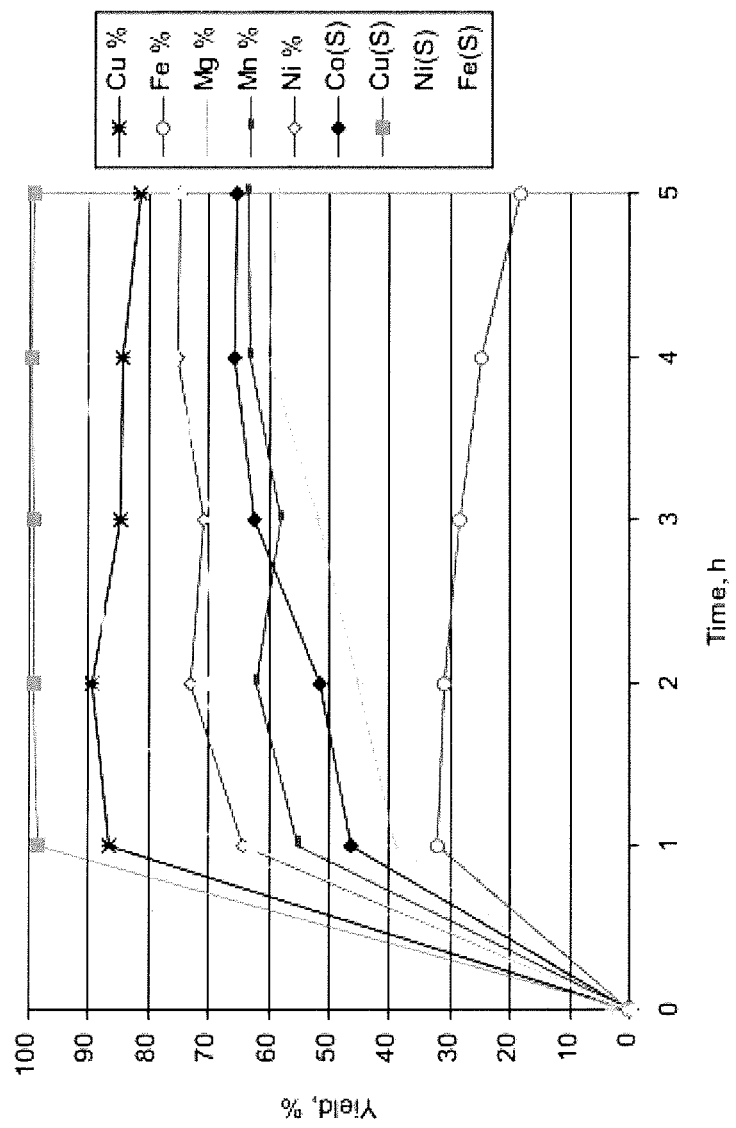

FIG. 1 is a diagram of one embodiment of the invention,
FIG. 2 is a diagram of another embodiment of the invention,
FIG. 3 presents a graph of the dissolution of various metals as a function of the amount of acid consumed, and
FIG. 4 presents a graph of the nickel recovery in a test as a function of time.

DETAILED DESCRIPTION OF THE INVENTION

The invention relates to a method for separating nickel and other valuable metals from a material with low nickel content generated in nickel ore flotation, or flotation tailings, which are usually routed to a tailings area. In addition to nickel, the material also includes iron; it has been found that the nickel in the material is mainly bound to sulphidic minerals containing iron, such as pyrrhotite and pentlandite, and only a small amount to silicaceous minerals. The amount of nickel in flotation tailings is typically in the region of half of one per cent. Flotation tailings also include other valuable minerals in addition to nickel, such as cobalt, copper and zinc, but in amounts that are a fraction of the amount of nickel. In addition to the above, flotation tailings also contain a considerable amount of magnesium.

Since the amount of valuable metals in nickel-poor material such as flotation waste is small, the valuable metal recovery process has to be designed taking process costs in particular into account. If for example the flotation tailings have to be subjected to another flotation treatment with all its scavenging and cleaning flotation stages, the method will be expensive. Likewise leaching the whole of the flotation tailings in an autoclave incurs too high a cost in relation to the price for the valuable metals obtained in the treatment. It has now been found in accordance with the invention that nickel and other valuable metals can be leached from nickel-poor material with atmospheric leaching by means of a leach solution containing sulphuric acid and an oxygen-containing gas. A small amount of copper may also be fed into the leach solution in order to optimise leaching, should there be no copper at all in the flotation tailings.

The simplest and most cost-effective method of all accordant with the invention is when only partial recovery of nickel is sufficient. In that case the method consists only of pulping of the nickel-poor material in an acidic aqueous solution, because it has been found in tests that by adjusting the pH to the desired range during pulping, for example 1.5-3.0, the first part of nickel, i.e. about 40% of the nickel, dissolves. The reactor volume required for pulping alone remains fairly small and at the same time the consumption of acid required for pH control of the aqueous solution remains low.

It is also possible to pre-treat the flotation tailings with concentrated sulphuric acid before pulping, so that the waste material is mixed into concentrated acid without water. In this way the metals in the nickel-poor material react with the acid and form sulphates. In pre-treatment silicates are partially dehydrated and their structure changes, facilitating post-leaching liquid-solids separation. Treatment reduces the formation of silicaceous gel during leaching and precipitation and thereby improves filterability.

When it is desired to recover as much of the nickel and other valuable metals from the nickel-poor material as possible, treatment of the material should be continued by leaching it after pulping. The second part of the nickel can be made to dissolve by means of leaching. In the tests carried out it was found that in the conditions in which nickel and other valuable metals dissolve, i.e. in the range of 1.5-3.0, the majority of the iron and magnesium also dissolve, but the iron is simultaneously re-precipitated. The pH range of the leaching solution is controlled depending on, for example, whether it is desired to dissolve the valuable metals bound to silicates also and in what form it is wished to precipitate the iron from the solution. In the alternative accordant with FIG. 1 the pH of the solution is adjusted to the range of 1.3-2.0, whereby the valuable metals bound to silicates also mostly dissolve. In the pH range in question, iron is precipitated as jarosite. In order for iron to be precipitated as jarosite, some suitable alkali compound is also fed into the leaching stage, for example sodium sulphate (not shown in detail in the drawing). A lower pH range demands a greater amount of sulphuric acid and for that reason the selected pH range may also depend on cost factors. Again, it was found in tests that the precipitation of iron as jarosite or another compound during leaching further improves the settling of solids in solid-liquid separation and reduces acid consumption. The recycling of the precipitated iron compound to the leaching stage promotes the dissolving of nickel.

When valuable metals are leached from flotation tailings in a pH range of below 2, as presented in the flowsheet of FIG. 1, part of the iron remains in the solution and is not precipitated in these conditions. In order to precipitate this second part of the iron a suitable neutralising agent such as lime is routed to the solution, by means of which the second part of the iron is precipitated as goethite and/or hydroxide. In this case too, recycling to pulping or leaching of the iron precipitate, particularly of the first jarositic part, is advantageous, even though it is not shown in the flowsheet. Preferably the precipitation of the second part of the iron is performed in a pH range of 2.5-2.9, whereby precipitation of the copper in solution along with the iron is prevented. Trivalent iron should be precipitated out of solution before the sulphide precipitation of valuable metals; divalent does not harm precipitation.

The embodiment accordant with FIG. 2 operates in a higher pH range, 2.0-3.0, whereby the valuable metals bound to silicates remain mostly undissolved and only the valuable metals bound to sulphides are recovered in leaching. Iron is precipitated in this case mainly as goethite and hydroxides in the leaching stage and therefore precipitation of the first part of the iron during leaching is the precipitation of the entire amount of iron.

Leaching of flotation tailings is preferably carried out at a solids content of 250-700 g/l. Since the solids content is fairly high, the reactors used for leaching should be equipped with effective mixing. It is advantageous to feed an oxygen-containing gas to the vicinity of the mixer. According to one embodiment, the oxygen-containing gas is fed into the solution outside the reactor, whereby an oxidation unit equipped with a static mixer is located outside the reactor, via which part of the leaching solution is circulated.

When the valuable metals have dissolved from the nickel flotation tailings, the dissolved and precipitated iron and the undissolved material are separated from the solution by solids-liquid separation. Separation takes place by some appropriate method, for example by countercurrent decantation (CCD), as presented in FIGS. 1 and 2, or by filtering or by thickening and filtering.

The nickel and other valuable metals dissolved in the leaching solution are subjected to sulphide precipitation. Precipitation can be done by means of any appropriate sulphide, such as hydrogen sulphide or sodium sulphide. If required, the solution is neutralised so as to achieve the right pH range. The advantage of sulphide precipitation is that it is selective, so that the impurities in the solution such as sodium, magnesium, calcium, manganese and divalent iron are not precipitated along with the valuable metals.

The precipitated valuable metal sulphide residue can be further subjected to sulphide leaching, so that the sulphides are leached in acidic conditions into a sulphuric acid solution and a sulphate solution containing valuable metals is obtained. Leaching is carried out either in an autoclave, whereupon the leaching time is around 2-3 h, or in atmospheric conditions, whereupon the leaching time is correspondingly longer. The sulphate solution containing valuable metals can be routed on to solvent extraction, precipitation and electrolysis for fabrication of each metal product.

It is advantageous to remove the magnesium and manganese from the leaching solution from which the valuable metals have been removed. This can be performed for example by hydroxide precipitation, whereby the pH value of the solution is raised for instance by means of slaked lime ($Ca(OH)_2$). The alkaline solution from which impurities have been removed can be used, for example, as the solution fed into the final stage of solids-liquid separation which takes place as counter-current decantation. Additionally, the alkaline solution can be used as the neutralising agent in the precipitation of the second part of the iron instead of or in addition to the above-mentioned limestone.

EXAMPLES

Example 1

A test was carried out with flotation tailings, of which the Ni content was 0.35%, the Cu content 0.07%, the Co content 0.007%, the Fe content 10.7% and the Mg content 15.6%. All the percentages are percentages by weight. About four fifths of the nickel is in sulphide minerals, such as pentlandite, violarite and pyrrhotite and the rest in silicaceous minerals. The test conditions are shown in the tables below, and the recovery of nickel and other metals is also presented as a graph in FIG. 3.

The leaching test was performed in a 5-liter reactor, in which there are baffles, temperature control, mixing with a gls mixer as well as pH and redox measurement. The pH was held constant at a value of 2.6 throughout the test by titrating the solution with concentrated sulphuric acid. The leaching temperature was 95° C., the mixing speed 1000 rpm, slurry density 400 g/L and oxygen feed 0.3 L/min. The oxygen feed was oxygen.

Samples were taken regularly during the test. Approx. 30 mL of slurry was taken as a sample from the central stages of the reactor, and was filtered by vacuum filtration. A solids sample was taken from the precipitate after the precipitate was washed and a solution sample was taken of the filtrate. The samples of Co, Cu, Fe, Mg, Mn and Ni were analysed using the ICP technique (ICP=Inductively Coupled Plasma). The samples of precipitate were analysed after total leaching. The precipitate samples were also analysed for sulphidic metals after bromine-methanol leaching.

00 h means the starting point when the slurry had reached the test temperature and 0 h the point when the target pH had been reached and oxygen feed started, in other words, pulping occurs between 00 and 0 h.

Solution Analyses:

| Time h | Co mg/l | Cu mg/l | Fe mg/l | Mg mg/l | Mn mg/l | Ni mg/l |
|---|---|---|---|---|---|---|
| 00 | 0 | 0 | <1 | 1790 | 2 | 0.7 |
| 0 | 7.3 | 31.8 | 5340 | 11600 | 165 | 616 |
| 1 | 7.7 | 9.4 | 6540 | 13600 | 180 | 665 |
| 2 | 8.3 | 2.7 | 9490 | 14500 | 195 | 724 |
| 4 | 7.9 | 1.7 | 5760 | 14700 | 189 | 701 |
| 6 | 9.2 | 12.8 | 2630 | 18600 | 223 | 816 |
| 10 | 11 | 17.8 | 2600 | 24800 | 250 | 896 |
| 14 | 10.2 | 33.6 | 1050 | 25400 | 228 | 814 |
| 18 | 11.8 | 88.6 | 671 | 31000 | 239 | 899 |
| 24 | 14.4 | 131 | 481 | 39000 | 256 | 1030 |
| 30 | 16.7 | 150 | 321 | 44400 | 271 | 1140 |

Solids Analyses: Total Leaching and (S)=Sulphidic Minerals

| Time h | Co % | Cu % | Fe % | Mg % | Mn % | Ni % | Co(S) % | Cu(S) % | Fe(S) % | Ni(S) % |
|---|---|---|---|---|---|---|---|---|---|---|
| 00 | 0.007 | 0.07 | 10.8 | 15.6 | 0.1 | 0.35 | 0.005 | 0.07 | 5.4 | 0.28 |
| 0 | 0.006 | 0.07 | 10.5 | 14.9 | 0.06 | 0.23 | 0.004 | 0.07 | 4.2 | 0.18 |
| 1 | 0.005 | 0.07 | 10.4 | 14.9 | 0.06 | 0.22 | 0.004 | 0.07 | 3.6 | 0.16 |
| 2 | 0.005 | 0.06 | 9.8 | 14.8 | 0.06 | 0.21 | 0.004 | 0.07 | 2.2 | 0.15 |
| 4 | 0.005 | 0.06 | 10.8 | 14.3 | 0.06 | 0.19 | 0.003 | 0.06 | 1.0 | 0.14 |
| 6 | 0.005 | 0.06 | 11.6 | 13.5 | 0.05 | 0.18 | 0.003 | 0.06 | 0.6 | 0.13 |
| 10 | 0.004 | 0.05 | 12.1 | 12.3 | 0.05 | 0.16 | 0.003 | 0.05 | 0.4 | 0.12 |
| 14 | 0.004 | 0.05 | 12.6 | 11.6 | 0.05 | 0.16 | 0.003 | 0.05 | 0.3 | 0.12 |
| 18 | 0.004 | 0.04 | 13.5 | 10.2 | 0.05 | 0.15 | 0.003 | 0.03 | 0.2 | 0.1 |
| 24 | 0.004 | 0.03 | 13.3 | 9.02 | 0.04 | 0.13 | 0.003 | 0.02 | 0.3 | 0.08 |
| 30 | 0.004 | 0.03 | 13.8 | 7.62 | 0.04 | 0.11 | 0.003 | 0.01 | 0.2 | 0.06 |

Recoveries:

| Time h | Co % | Cu % | Fe % | Mg % | Mn % | Ni % | Co(S) % | Cu(S) % | Fe(S) % | Ni(S) % |
|---|---|---|---|---|---|---|---|---|---|---|
| 00 | 0.0 | 0.0 | 0.0 | 0.0 | 0.0 | 0.0 | 0.0 | 0.0 | 0.0 | 0.0 |
| 0 | 23.5 | 10.4 | 11.1 | 16.9 | 42.0 | 42.8 | 30.4 | 15.5 | 32.3 | 44.1 |
| 1 | 24.8 | 3.1 | 13.6 | 17.7 | 46.2 | 45.9 | 31.1 | 20.0 | 42.6 | 50.8 |
| 2 | 26.7 | 0.9 | 19.8 | 20.3 | 48.4 | 49.6 | 32.8 | 22.0 | 65.8 | 55.0 |
| 4 | 25.4 | 0.6 | 12.0 | 19.5 | 48.8 | 52.3 | 47.3 | 23.5 | 84.4 | 56.1 |

-continued

| Time h | Co % | Cu % | Fe % | Mg % | Mn % | Ni % | Co(S) % | Cu(S) % | Fe(S) % | Ni(S) % |
|---|---|---|---|---|---|---|---|---|---|---|
| 6  | 29.6 | 4.2  | 5.5 | 25.3 | 52.3 | 55.4 | 48.2 | 32.2 | 90.6 | 60.2 |
| 10 | 35.4 | 5.8  | 5.4 | 33.7 | 58.9 | 60.6 | 49.6 | 37.6 | 94.5 | 63.7 |
| 14 | 32.8 | 11.0 | 2.2 | 39.0 | 59.8 | 61.6 | 50.8 | 43.8 | 95.2 | 64.8 |
| 18 | 37.9 | 28.9 | 1.4 | 51.1 | 64.1 | 68.8 | 55.1 | 70.1 | 96.8 | 73.3 |
| 24 | 46.3 | 42.7 | 1.0 | 57.9 | 66.6 | 73.6 | 56.3 | 82.3 | 96.2 | 78.4 |
| 30 | 53.7 | 48.9 | 0.7 | 65.8 | 67.9 | 78.6 | 58.0 | 88.0 | 97.9 | 84.2 |

The recovery table shows that 44% of the sulphidic nickel dissolved during pulping (00-0), so in some cases actual leaching can be omitted or performed only for a period of a few hours. The same thing is also shown in graph form in FIG. 3, in which the recovery of various metals is shown as a function of sulphuric acid consumption.

Example 2

The test accordant with the example was made in conditions in accordance with Example 1 other than for the fact that, at the start of the test, the pH was adjusted to be 1.5. In these conditions iron was precipitated as jarosite. The waste to be treated neutralised the solution during leaching so that the pH rose to the range of 2.3 and remained there until the end of leaching. The recovery of nickel was over 60% at the stage when pH 1.5 was reached and the recovery rose to a value of over 75% during the test. The solution recoveries are depicted in FIG. 4, in which the yields of the different metals are shown as a function of time.

The yields of the different metals are given below:

| Time h | Al % | Co % | Cr % | Cu % | Fe % | Mg % | Mn % | Ni % |
|---|---|---|---|---|---|---|---|---|
| 0 | —   | —    | —   | —    | 0.0  | 2.7  | 0.0  | 0.0  |
| 1 | 5.9 | 40.4 | 5.9 | 86.3 | 28.7 | 35.2 | 54.6 | 63.9 |
| 2 | 4.3 | 41.1 | 5.4 | 89.3 | 27.9 | 40.6 | 61.3 | 72.6 |
| 3 | 4.4 | 45.9 | 4.1 | 84.8 | 24.9 | 45.7 | 58.1 | 70.7 |
| 4 | 4.6 | 51.8 | 3.0 | 84.1 | 21.9 | 52.9 | 62.8 | 74.9 |
| 5 | 3.1 | 46.7 | 1.7 | 81.7 | 15.5 | 49.2 | 64.4 | 75.6 |

The invention claimed is:

1. A method for separating nickel and other valuable metals from nickel-poor iron-containing material generated in a nickel ore concentration process, which method comprises
   a) a pulping stage, wherein the nickel-poor material is pulped into an acid-containing leaching solution, and the pH of the leaching solution is adjusted to a range of 1.5-3.0,
   b) an atmospheric leaching stage, wherein the nickel-poor material obtained from the pulping stage is contacted with an acid-containing solution and an oxygen-containing gas.

2. The method according to claim 1, wherein after pulping of the nickel-poor material in the pulping stage, the material is routed to atmospheric leaching in which a second part of the nickel, the other valuable metals and iron are leached by means of an acid-containing solution and an oxygen-containing gas and in which a first part of the iron is precipitated during the atmospheric leaching stage, after which the precipitated iron is separated from the valuable metal-containing acid solution and the valuable metal-containing solution is routed to precipitation of nickel and other valuable metals, which is performed by sulphide precipitation.

3. The method according to claim 1, wherein the nickel-poor iron-containing material is the tailings of a nickel ore flotation process.

4. The method according to claim 1, wherein the dominant form of nickel and other valuable metals in the nickel-poor material is sulphides.

5. The method according to claim 1, wherein the pulping and leaching solution of the nickel-poor material is sulphuric acid based.

6. The method according to claim 2, wherein a first part of the iron is precipitated as jarosite.

7. The method according to claim 6, wherein a second part of the iron dissolved in the leaching solution is precipitated from the solution as hydroxide and goethite by neutralising and oxidising the solution.

8. The method according to claim 1, wherein the atmospheric leaching is performed in a pH range of 1.3-2.

9. The method according to claim 1, wherein the atmospheric leaching is performed in a pH range of 2.0-3.0.

10. The method according to claim 2, wherein a first precipitated part of the iron corresponds to the entire quantity of iron.

11. The method according to claim 2, wherein the atmospheric leaching is performed in a pH range of 2.0-3.0 and the iron is precipitated as goethite and hydroxide.

12. The method according to claim 2, wherein a precipitated iron compound is recycled to the leaching stage.

13. The method according to claim 1, wherein pulping and atmospheric leaching are carried out at a temperature between 60° C. and the boiling point of the solution.

14. The method according to claim 1, wherein the nickel-poor material is pre-treated before pulping with concentrated sulphuric acid.

15. The method according to claim 1, wherein the valuable metal sulphides are oxidised to sulphates at elevated oxygen pressure.

16. The method according to claim 2, wherein the leaching solution formed in sulphide precipitation, from which the valuable metals have been removed, contains magnesium and manganese, which are precipitated from the solution by neutralizing the solution.

17. The method according to claim 1, wherein the valuable metals of the nickel-poor material in addition to nickel are cobalt, copper and zinc.

* * * * *